(12) United States Patent
Tremblay

(10) Patent No.: US 6,460,887 B2
(45) Date of Patent: Oct. 8, 2002

(54) MOBILRACK

(76) Inventor: Pierre Tremblay, C/0 P. Biron P.O. Box 0732, Jackman, ME (US) 04945

( * ) Notice: Subject to any disclaimer, the term of this patent is extended or adjusted under 35 U.S.C. 154(b) by 39 days.

(21) Appl. No.: 09/730,565

(22) Filed: Dec. 7, 2000

(65) Prior Publication Data

US 2001/0008331 A1 Jul. 19, 2001

(30) Foreign Application Priority Data

Dec. 7, 1999 (CA) ............................................. 2291687

(51) Int. Cl.⁷ .............................. B62B 1/00; B60R 9/06
(52) U.S. Cl. ..................... 280/769; 280/47.24; 224/488
(58) Field of Search ........................... 280/47.24, 47.26, 280/47.27, 47.31, 47.315, 47.34, 30, 638, 35, 645, 42, 651, 79.3; 224/484, 486, 488, 489, 492, 493, 400, 310, 317, 329, 330, 331, 511, 512, 513

(56) References Cited

U.S. PATENT DOCUMENTS

| | | | | |
|---|---|---|---|---|
| 2,663,474 A | * | 12/1953 | Kelly ......................... 224/484 |
| 3,386,749 A | * | 6/1968 | Roudanez ................ 280/47.24 |
| 3,437,248 A | * | 4/1969 | Allen ......................... 224/309 |
| 4,078,708 A | * | 3/1978 | Mayer ....................... 211/70.5 |
| 4,336,897 A | * | 6/1982 | Luck .......................... 224/309 |
| 4,676,414 A | * | 6/1987 | Deguevara .................. 224/500 |
| 4,726,597 A | * | 2/1988 | Hickin ....................... 224/401 |
| 4,728,244 A | * | 3/1988 | Stokkendal ................. 224/319 |
| 4,744,590 A | * | 5/1988 | Chesney ..................... 224/520 |
| 4,863,080 A | * | 9/1989 | Graber ....................... 224/493 |
| 5,118,018 A | * | 6/1992 | Baldeck ...................... 224/493 |
| 5,328,066 A | * | 7/1994 | Cappuccio et al. ......... 224/506 |
| D374,209 S | * | 10/1996 | Lundgren .................. D12/412 |
| 5,593,076 A | * | 1/1997 | Biondo ....................... 224/485 |
| 5,826,768 A | * | 10/1998 | Gamulo ...................... 224/484 |
| D405,046 S | * | 2/1999 | Collins ...................... D12/412 |
| 6,152,462 A | * | 11/2000 | Barrett ........................ 280/30 |
| 6,254,117 B1 | * | 7/2001 | Cross ......................... 280/401 |
| 6,367,822 B1 | * | 4/2002 | Hutchins ..................... 248/99 |

* cited by examiner

*Primary Examiner*—Brian L. Johnson
*Assistant Examiner*—Bridget Avery

(57) ABSTRACT

A rack that can be installed on the rear of a vehicle to carry sporting gears like bicycles, skis, sailboards or the like. The rack has an adjustable handle that hooks on the hatchback of a vehicle and two wheels on its lower part that will rest against the bumper. The wheels make it possible to use the rack as a trolley. The rack is easy to fasten to sedan types of car using the hitch and an adapter.

7 Claims, 7 Drawing Sheets

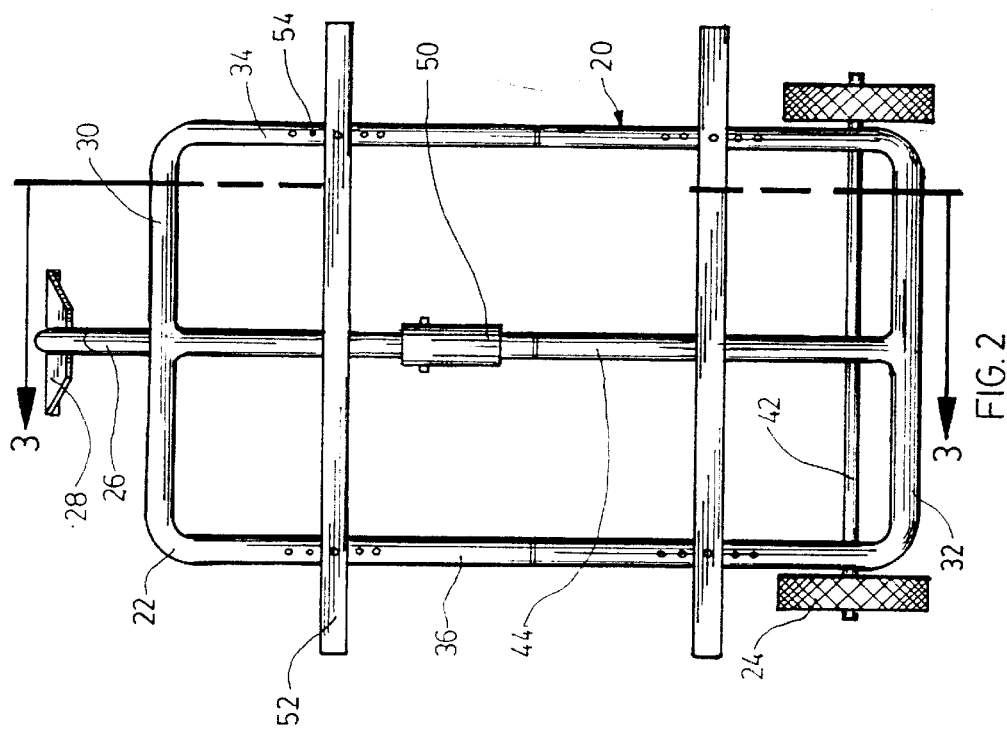
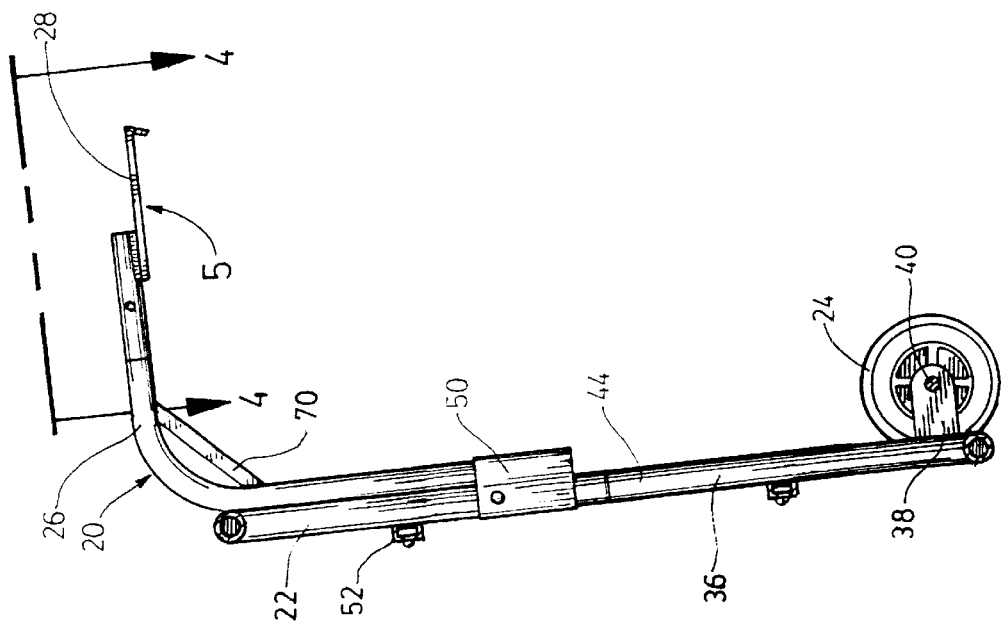

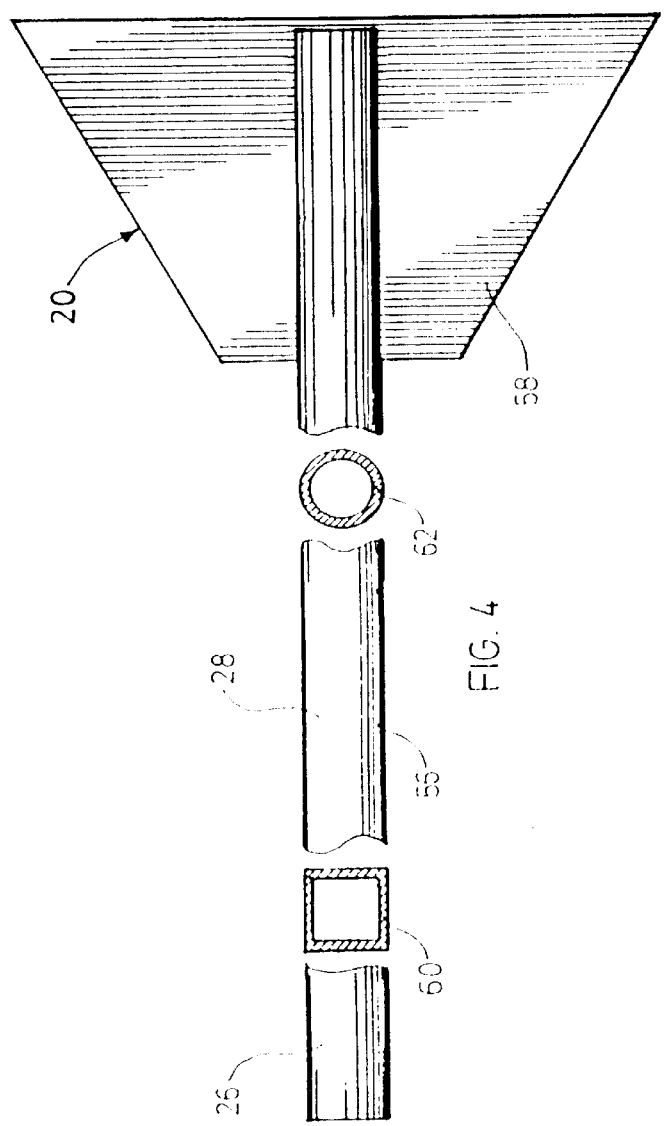
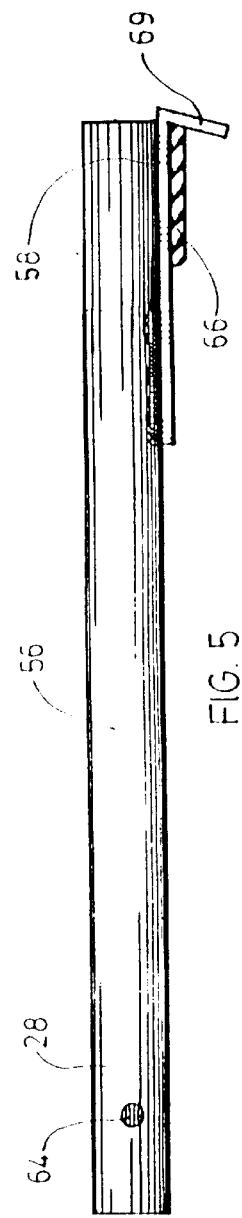

MOBILRACK

BACKGROUND

1. Field of Invention

This invention belongs to the family of racks that can be installed on a vehicle, particularly racks that can accommodate sporting gear as bicycles or skis.

2. Description of the Prior Art

Many racks for the transport of sporting gears exist. A review of the prior art has revealed the following patents:

U.S. Pat. No. 5,593,176, Biondo, Jan. 14$^{th}$ 1997 is a rack fixed to the rear of a car. The upper part of the rack is fixed on the hatchback of the car and the bottom rests against the license plate.

U.S. Pat. No. 5,118,018, Baldeck, Jun. 2$^{nd}$ 1992 is a bicycle rack that that can be installed on the front or rear bumper of a car. It comprises a series of straps to keep bicycles in place, the weight of it being supported by the bumper.

U.S. Pat. No. 4,728,244, Stokkendal Mar. 1$^{st}$ 1988, shows a combination roof rack-trolley.

U.S. Pat. No. 4,336,879, Luck, Jun. 29$^{th}$ 1982 shows a bicycle rack that comprises uprights and a cross bar. The upper part of this rack is attached on the hatchback of a car by straps and hooks secure its lower part against the bumper.

OBJECTS AND ADVANTAGES

The first objective of the present invention is to provide a rack that is installed on the rear of a vehicle, to transport sporting gears like skis, snowboards, sailboards, bicycles or the like. A rack that can also be used as a trolley to facilitate the transport of items to or from the vehicle. This rack comprises wheels that rest on the car, preventing scratches that could be caused by the metal part of the rack.

Another objective is to provide a mobile rack that comprises a central part to support sporting gear, an upper part that can grip the hinge of a hatchback and a lower part from which protrude the wheels that will rest against the bumper of a vehicle.

BRIEF DESCRIPTION OF THE DRAWINGS

The present invention will be further understood from the following description with reference to the drawings in which:

FIG. 2 is a front view of the rack of FIG. 1.

FIG. 3 is a section view according to line 3—3 of FIG. 2.

FIG. 4 is a section view according to line 4—4 of FIG. 3.

FIG. 5 is an enlargement of the part shown by arrow 5 of FIG. 3.

DESCRIPTION OF THE PREFERRED EMBODIMENT

Figure 1:
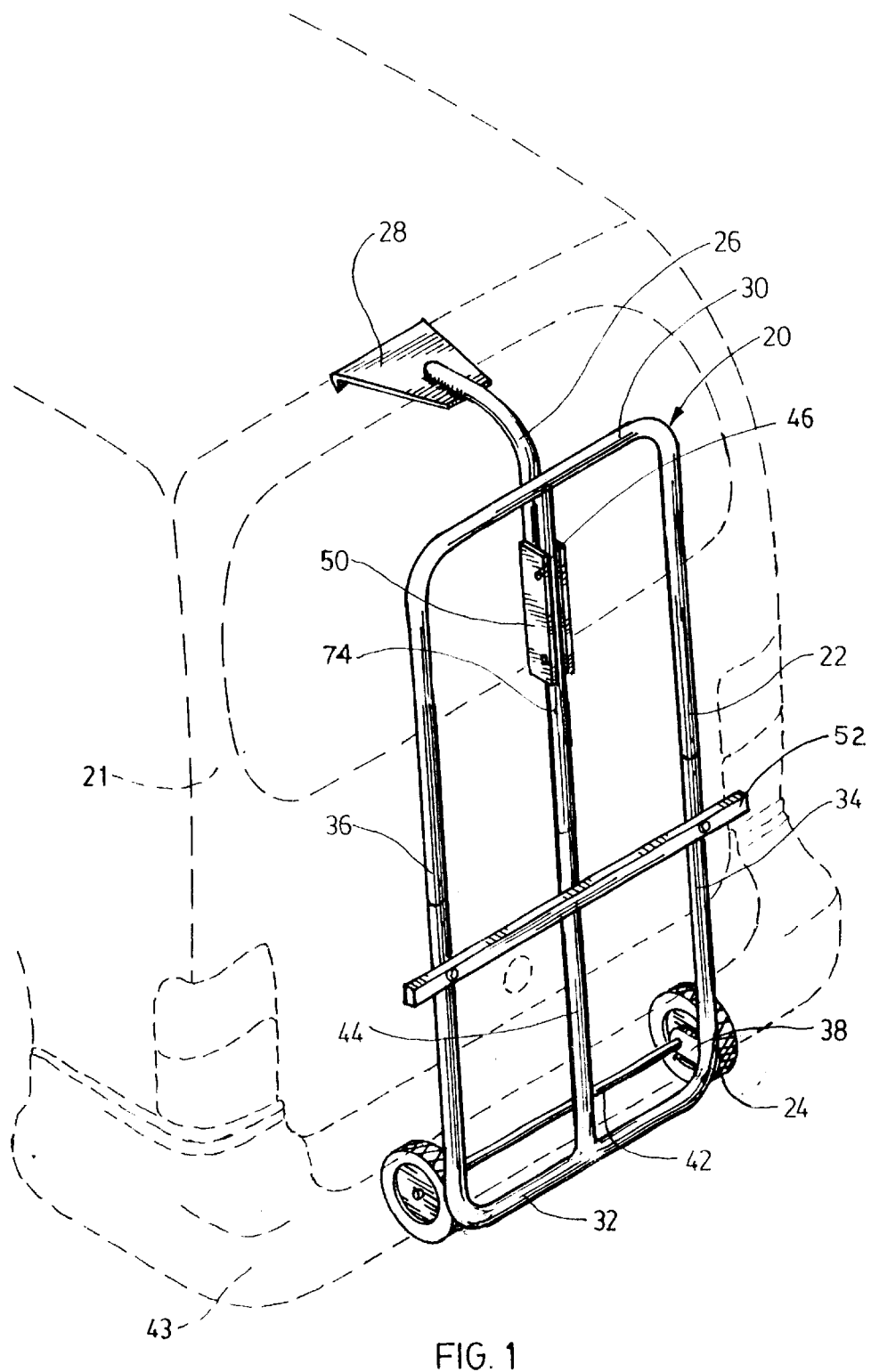
FIG. 1 is a perspective of the rack on a hatchback—in dotted line.

The preferred embodiment of the invention is illustrated in FIG. 1 where the same characterizing elements are identified by the same numbers.

FIG. 1 shows a rack 20 installed on the rear of a vehicle 21, shown in dotted line. This rack 20 comprises a rectangular frame 22, wheels 24 and a handle 26 that ends with a hook 28. The frame 22 is made of metal and comprises an upper bar 30, a lower bar 32 and two uprights 34 and 36. A metallic arm 38 is fixed on each end of the lower bar 32. These arms 38 have a perforation 40—FIG. 3—to accommodate a shaft 42. A wheel 24 is installed at each end of the shaft 42, on the outer side of the arms 38. When installed on the vehicle 21, the wheels 24 rest against the bumper 43 of the vehicle 21 to prevent the contact of the frame 22 with the vehicle 21. The shaft 42 usually is 5 to 30 cm of the bumper 43 to obtain a proportion of 12% of the height. A vertical median bar 44 is fixed on both upper and lower bars 30 and 32. A pair of plates 50, or tubing, are fixed to the median bar 44. The plates 50 receive the handle 26 and have fixing holes 46 to adjust the length of the handle 26. A series of holes 74 are present along the median bar 44 and allow to relocate the plates 50 on the median bar 44. Various additional parts may be added to the frame 22 to attach sporting gears. For example, detachable bars 52 may be installed on the uprights 34 and 36 to fasten skis.

FIG. 2 shows the rack 20 used as a trolley. The rack is shown with a pair of horizontal detachable bars 52 that are used to transport skis. The detachable bars 52 are placed on the upper and lower parts of the uprights 34 and 36. The bars 52 or any additional part are adjusted by means of a series of holes 54 located along the uprights 34 and 36. The location of the wheels 24 and of the handle 26 make it possible to unhook the rack 20 from the vehicle and put it on the ground to use it as a trolley.

FIG. 3 also shows the rack 20 without the vehicle. The handle 26 is shown as a bent metallic tube. The plates 50 fix the handle 26 on the frame 22 at the required length by means of the holes 46. The handle 26 projects out of the frame 22 at an angle of 95° to 105°. A reinforcement bar 70 links both parts of the handle 26 to reinforce it. One also notes the arm 38, at the bottom of the upright 36, which comprises a perforation 40 to accommodate the shaft 42 of the wheels 24.

FIG. 4 shows the farther end of the handle 26 with the hook 28. The hook comprises a small metallic tube 56 that slides into the handle 26 and a small L-shaped plate 58 that will grip on the hatchback of a vehicle. The tube of the handle 26 is square 60 while the small tube 56 is round 62.

FIG. 5 shows the hook 28. A series of holes 64 are present to adjust the length of the hook 28. A pad 66 is placed under the small plate 58 to protect the paint of the vehicle. The end 69 of the plate 58 is at an angle to secure the hold on the vehicle.

Figure 6:
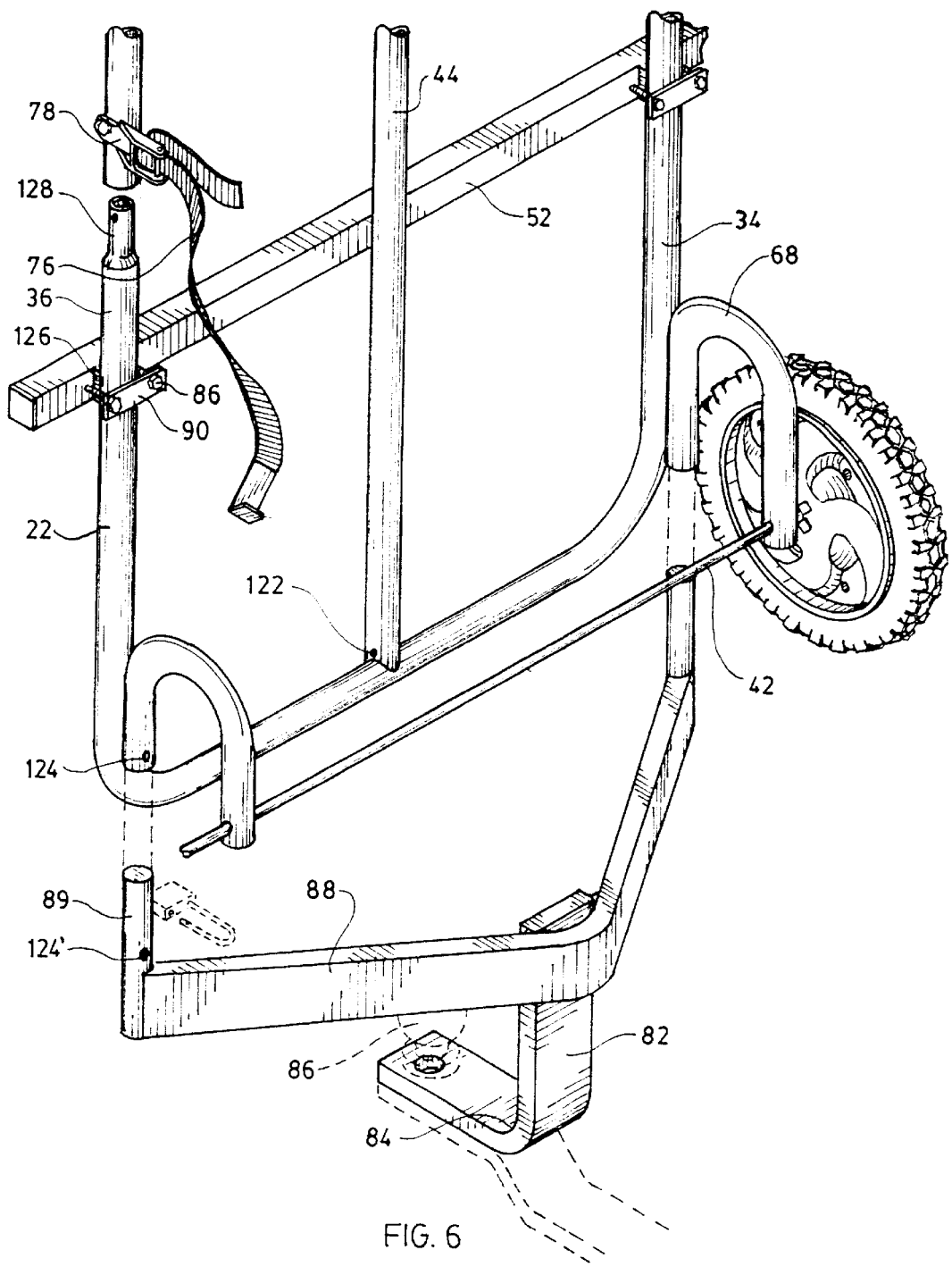
FIG. 6 is an another alternative of the Mobilrack.

FIG. 6 shows another alternative of construction of the rack 20. In this alternative, the arms 38—FIG. 1—are replaced with reversed U-shaped tubes 68 that are fixed on the lower part of the uprights 34 and 36 on one end. The other end of the tubes 68 accommodates the shaft 42. One also sees straps 76 and fastener 78 on the frame 22. An adapter 82 that has a lower part 84, L-shaped, that is bolted on the hitch 86 of the vehicle, in dotted line. The other end of the lower part 84 stands upright and links with the middle of a curved cross bar 88. At each end of the cross bar 88 is a vertical rod 89 that slides in the ends of the tube 68 close to the uprights 34 and 36. There may be holes for locking 124,124'. A drain 122 may be present at the bottom of the median bar 44. For ease of storage, the vertical bars of the frame 22 may have a coupling 128 with a male end in the lower part.

Figure 7B:
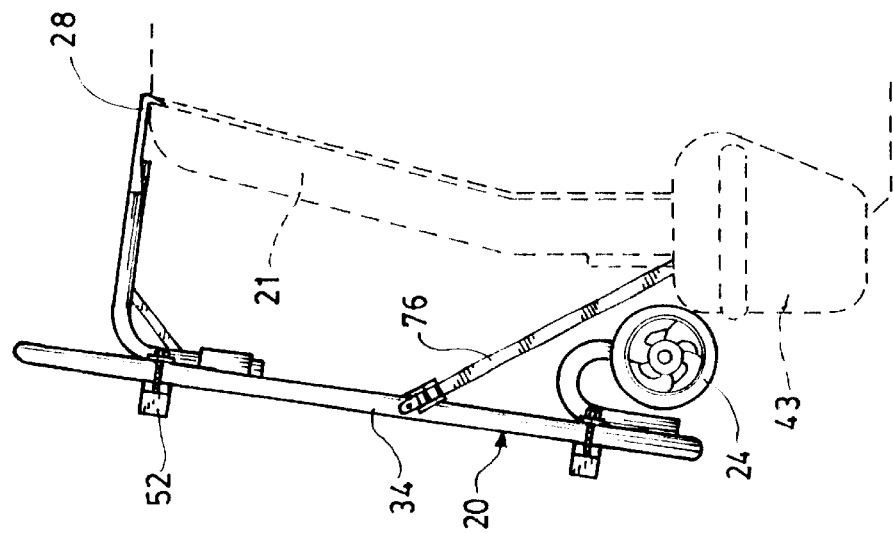
FIG. 7B is a side view of the rack of FIG. 6, installed on a vehicle without a hitch.
Figure 7A:
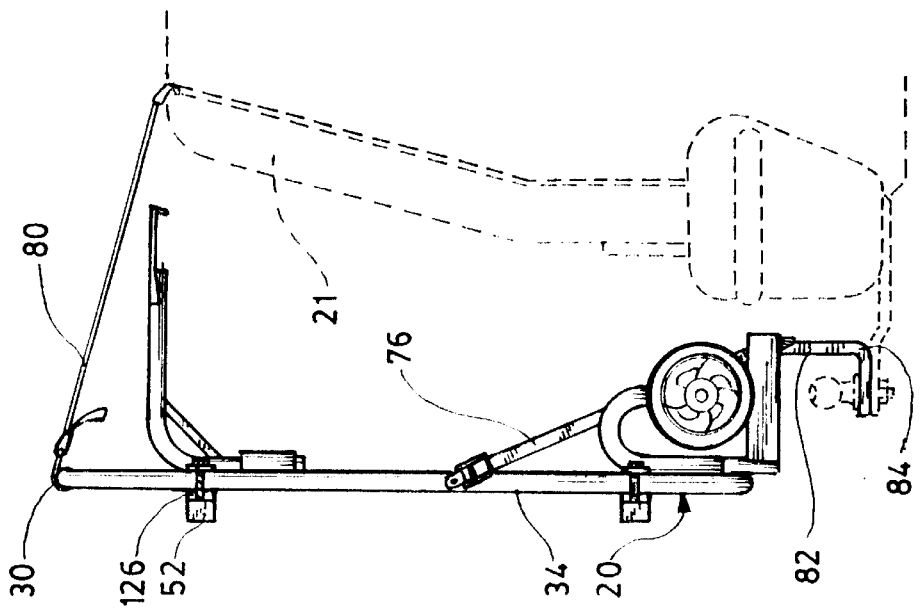
FIG. 7A is a side view of the rack of FIG. 6, installed on a vehicle.

FIG. 7A shows the rack 20 installed on a vehicle 21. A rope 80 goes from the upper bar 30 to the hinge of the hatchback of the vehicle 21. The adapter 82 fixes the lower part of the rack 20 to the vehicle 21. The straps 76 are fastened to the lower part 84 of the adapter 82 to secure the adapter 82 in place. The detachable bar 52 may use a spacer 126.

FIG. 7B shows the installation of the rack 20 when the vehicle 21 does not have a hatch. In this case, the hook 28 is hooked on the hinge and the wheels 24 rest on the bumper. The straps 76 are attached at the bottom of the hatchback door. A sliding tube 51 may be used instead of the plates 50.

Figure 8:
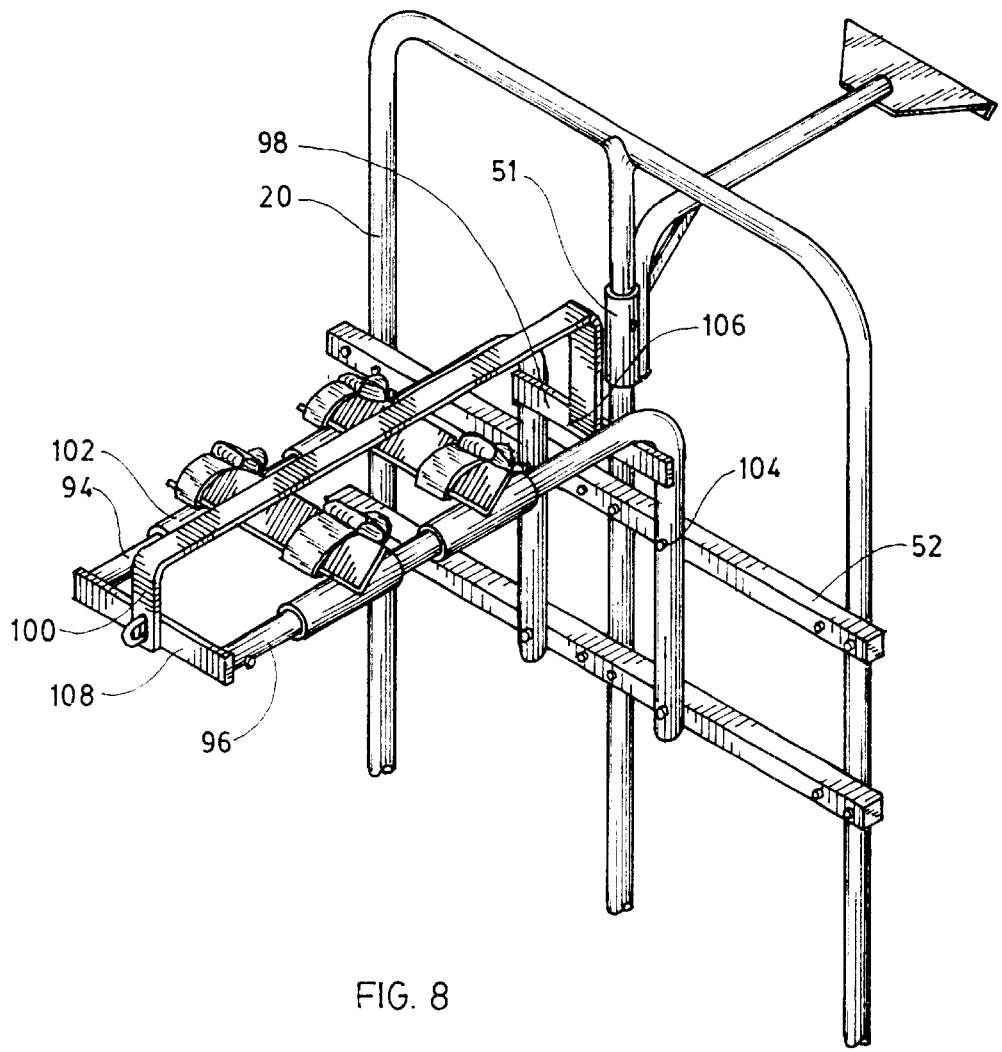
FIG. 8 shows a bicycle rack.

FIG. 8 shows an additional part that can be fixed to the frame to transport bicycle. This bicycle support 94 is made of two L-shaped tubes 96 connected by a cross bar 98. The tubes 96 are screwed on the horizontal bars 52. On each side of the median bar 44. The tubes 96 have holes 104 to allow screwing the support 94 to the horizontal bars 52. A locking bar 100 slides in a slot 106 cut into the cross bar 98. A shoe 102 slides in the tube and a detachable end 108 is inserted in the end of the tubes 96.

Figure 9:
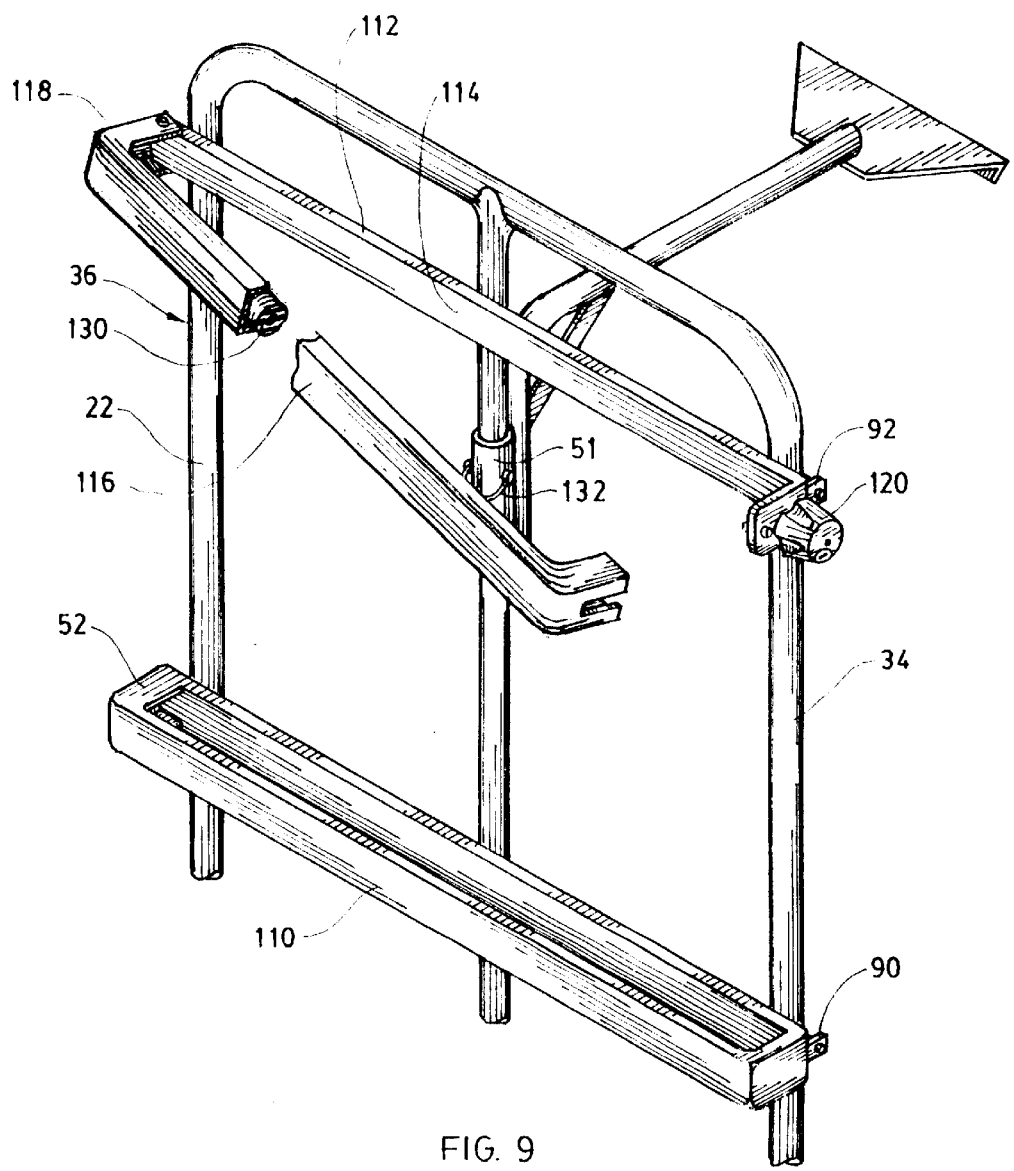
FIG. 9 shows a ski rack.

FIG. 9 shows the assembly of the horizontal bars 52 on the frame 22. There is two type of bars. The lower bar 110 has the shape of a slot to allow skis to be slid in. The higher bar 112 is in fact two parallel bars 114 and 116 on a hinge 118. The first bar 114 is placed against the frame at the desired location. A small restraining plate 90 is placed on the other side of the uprights, 34 and 36, at each of the fastening locations of the frame. Screws 92 join the plate 90 and the first bar 114, holding it in place on the frame 22. The second bar 116 swivel on the hinge 118 to allow ski to be placed against the first bar 114 and is locked back in place by a knob 120. The second bar 116 may be made of a C channel with a rubber pad 130 within the opening of the C. The sliding tube 51 may be provided with a handle lock 132.

SUMMARY OF THE INVENTIONS

A detachable rack to be installed on a vehicle with a support extension on its lower part and a hatchback; the rack comprising a frame comprising a top, a bottom and two sides, the bottom comprising two widely spaced arms extending toward the support extension, the arms equipped with wheels that allow the rack to be used as a trolley, the top having a handle protruding from the frame and comprising a hook, generally perpendicular with the frame and pointing toward the hinge of the hatchback to hook to the hatchback and to be used as a grip for the trolley, the combination of the handle, the frame and the arms having a C shape, with a web and two wings, an upper wing and to lower wings, the wings resting on with the vehicle.

In the preferred embodiment, the rack comprises a median bar fixed on the top and the bottom of the frame, the median bar receiving the handle.

The median bar comprises plates, the handle sliding between the plates. The hook can slide into the handle and comprises a pad that will rest on the hatchback. The support extension may be a bumper and the wheels be connected with a shaft, 5 to 30 cm from the bumper, to obtain a proportion of 12% of the height.

The handle projects from the frame at an angle of 95° to 105° with the plane of the frame. The frame has a series of holes to allow additional parts to be fixed to it, the additional parts facilitating a firm holding of carried items. The bottom of the rack is fastened to the hitch of the vehicle through an adapter, the adapter having a Y-shape, the lower part being bolted to the hitch and the upper parts of the adapter being rods adapted to slide into the sides of the frame.

Other embodiments are possible and limited only by the scope of the appended claims:

I claim:

1. A detachable rack to be installed on a vehicle with a support extension on its lower part and a hatchback provided with a hinge on its upper part, said rack comprising a frame comprising a top, a bottom and two sides, said rack further comprising a median bar fixed between said top and said bottom of said frame, said bottom comprising two widely spaced arms extending toward said support extension, said arms equipped with wheels that allow said rack to be used as a trolley, said top having a handle protruding from said median bar of said frame and comprising a hook, generally perpendicular with said frame and pointing toward said hinge of said hatchback to hook to said hatchback and to be used as a grip for said trolley, the combination of said handle, said frame and said arms having a C shape, with a web and two wings, an upper wing and two lower wings, said wings resting on said vehicle.

2. The rack of claim 1 wherein said median bar comprises plates, said handle sliding between said plates.

3. The rack of claim 1 wherein said handle projects from said frame with an angle of 95° to 105° with the plane of said frame, said rack when installed being strengthened by means of straps (76) tying said sides of said frame to said support extension.

4. The rack of claim 1 wherein said median bar of said frame has a series of holes to allow additional parts to be fixed to said frame, said additional parts facilitating a holding of carried items.

5. The rack of claim 1 wherein said bottom of said rack is fastened to a hitch of said vehicle through and adapter, said adapter having a Y-shape, the lower part being bolted to said hitch and the upper parts of said adapter being rods adapted to slide into said sides.

6. The rack of claim 2 wherein said hook can slide into said handle and comprises a pad adapted to rest against said hatchback.

7. The rack of claim 2 wherein said support extension is a bumper and wherein said wheels are connected with a shaft, 5 to 30 cm from said bumper, to obtain a proportion of 12% of the height of said median bar.

* * * * *